United States Patent Office 3,657,258
Patented Apr. 18, 1972

3,657,258
AMINOBENZYLCYCLOALKYLNITRILES
Hans-Joerg Treiber, Bruehl, and Frank Zimmermann, Mannheim, Germany, assignors to Knoll A.G. Chemische Fabriken, Ludwigshafen (Rhine), Germany
No Drawing. Filed Sept. 16, 1969, Ser. No. 858,513
Claims priority, application Germany, Sept. 25, 1968, P 17 93 488.2
Int. Cl. C07d 29/32
U.S. Cl. 260—293.62       17 Claims

ABSTRACT OF THE DISCLOSURE

Aminobenzylcycloalkylnitriles of the general formula

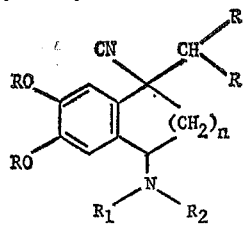

wherein R is lower alkyl; $n$ is 1 or 2; $R_1$ is hydrogen or lower alkyl and $R_2$ is straight or branched chain alkyl, cycloalkyl, aralkyl or halo, alkoxy, benzyloxy or trifluoromethyl substituted cycloalkyl or aralkyl or taken together with the N atom $R_1$ and $R_2$ are pyrrolidinyl, piperidino, morpholino, piperazino, or N-methylpiperazino, their acid addition salts and pharmaceutically acceptable compositions containing said compounds. The compounds are blood pressure depressants and exhibit spasmolytic and anti-inflammatory properties as well as cardiac activity, such as dilation of coronary vessels and hence are useful in the treatment of hypertension, anginal seizures and related ailments.

---

This invention relates to aminobenzylcycloalkylnitriles, their addition salts and pharmaceutical compositions containing said compounds and method of preparing same.

German Pats. 1,154,810 and 1,158,083, German patent applications P 15 93 921.6 and P 16 43 429.0 and U.S. Pat. 3,261,859 disclose that basically substituted phenylacetonitriles are effective cardiac symphaticolytics and coronary dilators; while German Pat. 946,058 discloses that 3-aminoindane exhibits spasmolytic and local anesthetic properties.

The present aminobenzylcycloalkylnitrile compounds and their acid addition salts exhibit spasmolytic, blood pressure-lowering and cardiac activity, such as coronary dilation, properties and are pharmacologically useful in the treatment of hypertension, anginal seizures and related ailments.

The present compounds and their acid addition salts are characterized by the general formula

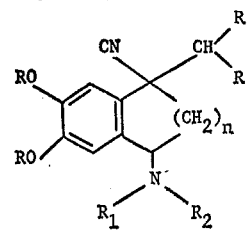

wherein R is lower alkyl; $n$ is 1 or 2; $R_1$ is hydrogen, or lower alkyl and $R_2$ is straight or branched chain alkyl, cycloalkyl, aralkyl or halo, alkoxy, benzyloxy or trifluoromethyl substituted cycloalkyl or aralkyl or taken together with the N atom $R_1$ and $R_2$ are pyrrolidinyl, piperidino, morpholino, piperazino, or N-methylpiperazino.

The preferred compounds are ones in which R is methyl.

The method of making the compounds comprises in general reacting a halobenzylcycloalkylnitrile of the general formula

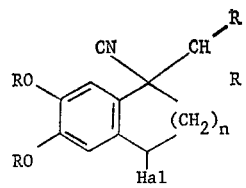

wherein Hal is chlorine or bromine; R is lower alkyl, preferably methyl and $n$ is 1 or 2 with an amine of the general formula

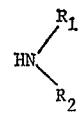

wherein $R_1$ and $R_2$ are as defined above with reference to Formula I. The reaction product is then alkylated, when necessary, by known methods.

The reaction can be carried out in several ways. For example, both reactants can be heated together; or, both reactants can be dissolved in a suitable solvent, such for example as methylene chloride or toluene, and then heated to boiling; or, the halobenzylcycloalkylnitrile can be introduced into the amine dropwise in the presence or absence of a solvent. The reaction temperature varies within wide limits. Often the reaction occurs at 20° C. although higher temperatures can also be used.

Generally, the halo compound is reacted with a twice molar quantity of the amine in order to bind the halogen hydride firmed. The crude products can be purified by distillation or conversion to the hydrochloride addition salts. Secondary bases can be transformed to tertiary bases when necessary, in a known manner by means of alkylating agents. For methylation, a mixture of formaldehyde and formic acid is preferred.

It is known to prepare halobenzylcycloalkyl compounds either by substitution reactions of the corresponding substituted benzylcycloalkyl compounds or by halogenation and hydrogenation addition reactions of benzocycloalkenyl compounds. In this manner 1-chloroindane is obtained by the addition of hydrogen chloride to indane, or 1-chloro-1,2,3,4-tetra-hydronaphthaline by reaction with 1,2-dihydronaphthaline. These compounds are also obtainable from the corresponding hydroxyl-substituted compounds. See, M. Protiva et al., Chem. Listy 47, 213 (1953) also C. A. 49, 199 (1955); and R. Weisgerber, Ber. dtsch. Chem. Ges. 44, 1436 (1911). The prior methods are characterized by the fact that the halogen is introduced into an already existing ring system.

Likewise, 1,2-benzocycloalkylnitriles are obtainable by intramolecular cyclisation of suitable o-chlorophenylalkylnitriles in the presence of potassium amide. See J. F. Bunett and J. A. Skorcz, J. Org. Chem., 27, 3836 (1962). However this ring-closure reaction is not suited for the preparation of halogen substituted ring compounds.

The starting halobenzylcycloalkylnitriles of general Formula II are prepared by an intramolecular ring closure reaction of ω-aryl-ω-cyanoalkylaldehydes or their acetals with gaseous halogen hydride or with acid halogenides at low temperatures and in the presence of inert solvents.

Typical useful acid halogenides include inorganic halogenides like thionyl chloride, thionyl bromide, phosphoroxychloride, phosphoroxybromide, phosgene, thiocarbonyl chloride, phosphorus pentachloride, and acyl halides of the formula RCO-Hal, wherein R is alkyl or aryl, like acetyl chloride, acetyl bromide, benzoyl chloride, or halides of dibasic acids like oxalylchloride, or the like. The acetals, especially the lower alkyl acetals, are well suited as reactants.

Preferably, the aldehyde or acetal is dissolved in an inert organic solvent. Typical solvents include the following: hydrocarbons, aliphatic or aromatic like hexane, benzene, toluene, petroleum ether, tetrahydrofuran, halogenated hydrocarbons (di-, tri- or tetra-halogenated) such as, dichloromethane, dibromoethane, trichloroethane, dichloropropane, chlorobenzene, methylene halides like chloroform, methylene chloride, methylene bromide, tetrachloroethane and the like.

The temperature of reaction is generally maintained in the range of about 0° C. to about 30° C. to minimize further reaction and the formation of side products. The ring-closure is generally terminated within 2 to 3 hours, depending on the reactivity of the individual aldehyde or acetal. The isolation of the product of the invention follows in a conventional manner, for instance by separation as by filtration of the precipitated product, or distilling off the solvent partially or completely. The purified product is obtained by crystallization or distillation. The halonitriles of the invention are generally obtained in yields of 75 to 90%.

The following are illustrative but not-limitative examples of the present compounds and their preparation.

EXAMPLE 1

1-cyano-1-isopropyl-4-[N-methyl-N-β-(3,4-dimethoxyphenyl)-ethyl]-amino-6,7-dimethoxy-tetraline A mixture of 29.3 g. (0.1 mol) 1-cyano-1-isopropyl-4-chloro-6,7-dimethoxy-tetraline [prepared by cyclization of α-(3,4-dimethoxyphenyl) - α - isopropyl - ω - diethoxyvaleronitrile with hydrogen chloride] and 39.0 g. (0.2 mol) N-methyl-homoveratryl-amine is heated to 100° C. under agitaton. At 100° C. an exothermic reaction sets in and the temperature increases to approximately 140° C. Agitation is continued for 30 minutes more and 100 cc. toluene is added to the reaction mixture and then filtered. Upon cooling the N-methyl-homoveratrylamine hydrochloride precipitated. The filtrate is concentrated and the residue is distilled in vacuo.

27.2 g. (60% of the theory) of 1-cycano-1-isopropyl-4-[N-methyl - N - β - (3,4 - dimethoxyphenyl) - ethyl]-amino-6,7-dimethoxytetraline, B.P. 0.001 mm. 240° C. is obtained; the hydrochloride melts at 167° C. (from isopropanol).

The compounds 2–10 of Table 1 have been prepared in like manner as the above Example 1.

TABLE 1

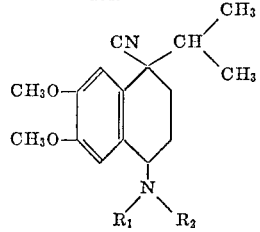

| Ex. | $R_1$ | $R_2$ | B.P., °C./mm. | Yield, percent | M.P., °C. hydrochloride | Name |
|---|---|---|---|---|---|---|
| 2 | H— | —CH₂—CH₂—C₆H₄—OCH₃ | 255/0.001 | 65 | 137 | 1-cyano-1-isopropyl-4-[N-β-(4-methoxyphenyl)-ethyl]-amino-6,7-dimethoxy-tetraline. |
| 3 | CH₃— | —CH(CH₃)—CH₂—C₆H₅ | 220/0.001 | 64 | 128 | 1-cyano-1-isopropyl-4-(N-methyl-N-β-phenyl-α-methyl-ethyl)-amino-6,7-dimethoxy-tetraline. |
| 4 | CH₃— | —CH₂—C₆H₃(OCH₃)(OCH) | 240/0.001 | 54 | 140 | 1-cyano-1-isopropyl-4-[N-methyl-N-(3,4-dimethoxybenzyl)]aminc-6,7-dimethoxytetraline. |
| 5 | CH₃— | —CH₂—CH₂—C₆H₂(OCH₃)₃ | 260/0.005 | 49 | 118 | 1-cyano-1-isopropyl-4-[N-methyl-N-β-(3,4,5-trimethoxyphenyl)-ethyl]-amino-6,7-dimethoxy-tetraline. |
| 6 | CH₃— | —CH₂—CH₂—C₆H₄—CF₃ | 210/0.01 | 62 | 179–180 | 1-cyano-1-isopropyl-4-(N-methyl-N-β-(3-trifluoromethylphenyl)-ethyl]-amino-6,7-dimethoxy-tetraline. |
| 7 | | —(CH₂)₅— | 190/0.005 | 88 | 183 | 1-cyano-1-isopropyl-4-pyrrolidinyl-6,7-dimethoxy-tetraline. |
| 8 | | —(CH₂)₆— | 190/0.005 | 28 | 208 | 1-cyano-1-isopropyl-4-piperidnio-6,7-dimethoxy-tetraline. |
| 9 | | —(CH₂)₂—O—(CH₂)₂— | 210/0.001 | 84 | 188 | 1-cyano-1-isopropyl-4-moprholino-6,7-dimethoxy-tetraine. |
| 10 | | —(CH₂)₂—N(CH₃)—(CH₂)₂— | 210/0.001 | 71 | 211 | 1-cyano-1-isopropyl-4-(N'-methyl)-piperazino-6,7-dimethoxy-tetraline. |

EXAMPLE II 1-cyano-1-isopropyl-4-(n-hexyl)-amino-6,7-dimethoxy-tetraline

To a solution of 10.1 g. (0.1 mol) N-hexylamine in 50 cc. toluene is added, dropwise, at room temperature within 15 minutes under agitation a solution of 16.9 g. (0.05 mol) 1-cyano-1-isopropyl - 4 - bromo-6,7-dimethoxy-tetraline [prepared by the cyclization of α-1(3,4-dimethoxyphenyl)-α-isopropyl-ω-diethoxy-ω-diethoxyvaleronitrile with hydrogen bromide] in 50 cc. methylene chloride. A precipitate of N-hexylamine hydrobromide is formed. Upon agitation for 2 hours the precipitate is sucked off, the filtrate is concentrated, the residue is taken up with ether, and the hydrochloride of 1-cyano-1-isopropyl-4-(n-hexyl) - amino - 6,7 - dimethoxy-tetraline is precipitated by the introduction of dry hydrogen chloride. 9.1 g. (51% of the theory) of the hydrochloride is obtained; M.P. =150° C.–151° C. (from isopropanol).

The compounds 12–18 of Table 2 have been prepared in like manner as in the foregoing Example 11.

EXAMPLE 19

1-cyano-1-isopropyl-3-piperidino-5,6-dimethoxy-indane

Added dropwise to a solution of 8.5 g. (0.1 mol) piperidine in 50 cc. toluene at 20° C. within 15 minutes under agitation is a solution of 16.2 g. (0.05 mol) 1-cyano-1-isopropyl - 3 - bromo - 5,6-dimethoxy-indane [prepared by cyclization of α-(3,4-dimethoxyphenyl)-α-isopropyl-γ-diethoxybutyronitrile with hydrogen bromide] in 50 cc. methylene chloride. Upon agitating for 2 hours the piperidine hydrobromide is precipitated and then sucked off, the filtrate concentrated, the residue taken up in ether. The hydrochloride of 1-cyano-1-isopropyl-3-piperidino-5,6-dimethoxy-indane is precipitated by the introduction of dry hydrogen chloride.

13.6 g. (75% of the theory) of the hydrochloride is obtained; M.P.=230° C. (from isopropanol).

The compounds 20–29 of Table 3 have been prepared in like manner as in the foregoing Example 19.

TABLE 2

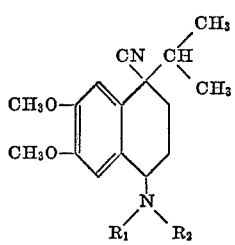

| Ex. | $R_1$ | $R_2$ | Yield, percent | M.P., ° C. hydrochloride | Name |
|---|---|---|---|---|---|
| 12 | H | —CH(CH₃)₂ | 55 | 192 | 1-cyano-1-isopropyl-4-(α-methyl-ethyl)-amino-6,7-dimethoxy-tetraline. |
| 13 | H | —CH₂—CH₂—C₆H₅ | 52 | 192 | 1-cyano-1-isopropyl-4-(β-phenyl-ethyl)-amino-6,7-dimethoxy-tetraline. |
| 14 | H | —CH(CH₃)—CH₂—C₆H₅ | 53 | 220 | 1-cayno-1-isopropyl-4-(α-methyl-β-phenylethyl)-amino-6,7-dimethoxy-tetraline. |
| 15 | H | —CH₂—CH₂—C₆H₃(OCH₃)₂ | 28 | 184 | 1-cyano-1-isopropyl-4-[β-(3,4-dimethoxyphenyl)-ethyl]-amino-6,7-dimethoxy-tetraline. |
| 16 | H | —CH₂—CH₂—C₆H₃(OC₂H₅)₂ | 32 | 172 | 1-cyano-1-isopropyl-4-[β-(3,4-diethoxyphenyl)-ethyl]-amino-6,7-dimethoxy-tetraline. |
| 17 | CH₃— | —C₆H₁₁ | 63 | 188 | 1-cyano-1-isopropyl-4-(N-methyl-N-cyclohexyl)-amino-6,7-dimethoxy-tetraline. |
| 18 | H | —CH₂—CH₂—C₆H₃(OCH₃)(OCH₂C₆H₅) | 42 | 171 | 1-cyano-1-isopropyl-4-[β-(3-benzyloxy-4-methoxyphenyl)-ethyl]-amino-6,7-dimethoxy-tetraline. |

TABLE 3

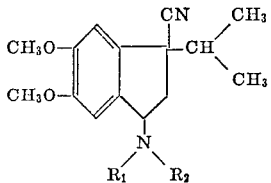

| Ex. | R₁ | R₂ | Yield, percent | M.P., °C. hydrochloride | Name |
|---|---|---|---|---|---|
| 20 | H | —CH(CH₃)₂ | 68 | 226 | 1-cyano-1-isopropyl-3-(α-methylethyl)-amino-5,6-dimethoxy-indane. |
| 21 | H | —CH₂—CH₂—CH₂—C₆H₅ | 63 | 150 | 1-cyano-1-isopropyl-3-(γ-phenylpropyl)-amino-5,6-dimethoxy-indane. |
| 22 | H | —CH₂—CH₂—C₆H₄—Cl | 57 | 222 | 1-cyano-1-isopropyl-3-[β-(4-chlorophenyl)-ethyl]-amino-5,6-dimethoxy-indane. |
| 23 | H | —CH₂—CH₂—C₆H₄—CF₃ | 54 | 223 | 1-cyano-1-isopropyl-3-[β-(3-trifluoromethylphenyl)-ethyl]-amino-5,6-dimethoxy-indane. |
| 24 | H | —CH₂—CH₂—C₆H₂(OCH₃)₃ | 97 | 205 | 1-cyano-1-isopropyl-3-[β-(3,4,5-trimethoxyphenyl)-ethyl]-amino-5,6-dimethoxy-indane. |
| 25 | CH₃— | —CH(CH₃)—CH₂—C₆H₅ | 56 | 200 | 1-cyano-1-isopropyl-3-[N-methyl-N-(α-methyl-β-phenyl)-ethyl]-amino-5,6 dimethoxy-indane. |
| 26 | CH₃— | —CH₂—CH₂—C₆H₃(OCH₃)₂ | 37 | 177 | 1-cyano-1-isopropyl-3-[N-methyl-N-β-(3,4-dimethoxyphenyl)-ethyl]-amino-5,6-dimethoxy-indane. |
| 27 | C₂H₅— | —C₂H₅ | 70 | 185 | 1-cyano-1-isopropyl-3-diethylamino-5,6-dimethoxy-indane. |
| 28 |  | —(CH₂)₂—O—(CH₂)₂— | 72 | 219 | 1-cyano-1-isopropyl-3-morpholino-5,6-dimethoxy-indane. |
| 29 |  | —(CH₂)₂—N(CH₃)—(CH₂)₂— | 78 | 207 | 1-cyano-1-isopropyl-3-(N'-methyl-piperazino-5,6-dimethoxy-indane. |

Other compounds coming within the purview of the invention are 1-cyano-1-isobutyl-4-[N-methyl-N-β-(3,4-dimethoxyphenyl)-ethyl]-amino-6,7-dimethoxy-tetraline; 1-cyano - 1 - isopropyl-3-[β-(4-bromophenyl)-ethyl]-amino-5,6 - dimethoxy - indane; and 1 - cyano-1-isopropyl-4-[N-methyl - N - β-(3,4-diethoxyphenyl)-ethyl]-amino-6,7-dimethoxy-tetraline.

The instant 4 - cyano - 4 - phenylamino - cyclohexanes exhibit an unusual combination of properties in that they are spasmolytic, blood pressure depressants, anti-inflammatory and active on the blood circulatory system.

The compounds of the present invention are used to lower the blood pressure and preferably administered orally. A dose of one to two tablets containing about 50 mg. thereof three times daily is a useful dosage to produce satisfactory results. The maintenance dose is about one tablet of about 25 mg. given three times daily. The dose may vary, of course. The daily dose is between about 100 mg. and about 250 mg. provided in three to four single doses. See "The Pharmacological Basis of Therapeutics" by Goodman and Gilman, Third Edition, The Macmillan Company, Section VI, Chapter 33, entitled "Antihypertensive Agents and The Drug Therapy of Hypertension" which, as well as Section IV, is herein incorporated by reference.

Intravenous and intramuscular injection or rectal application in the form of suppositories may also be employed as mode of administration. For injections, aqueous or saline solutions can be used. The new compounds of the present invention may be administered orally in the form of tablets, pills, powders, capsules, solutions, emulsions, suspensions, dispersions, and in any other suitable form.

In the case of powders, fine, uniform dispersions of the new compounds are preferable. Such dispersion can be achieved, for instance, by mixing and milling the new compounds with a solid, pulverulent extending agent to the desired fineness, or by impregnating the already milled, finely powdered, solid carrier with a solution of the active compound in water, or a water-miscible solvent and then removing the water or solvent. As solid carriers, which are suitable for the manufacture of useful pharmaceutical preparations, various inert pulverulent distributing agents as they are conventionally used in pharmaceutical compounding may be employed. When preparing tablets, pills, powders, and the like, the commonly used diluting agents, binders, lubricants, and the like are added, such as sugar, lactose, talcum, starch, pectins; as binders gelatin, gum arabic, methyl cellulose, yeast extract, agar, tragacanth; and as lubricating agents, magnesium stearate, stearic acid, and others.

It is understood that other acid addition salts than those mentioned and described hereinabove may be prepared, for instance, acid addition salts with sulfuric acid, sulfamic acid, phosphoric acid, hydrobromic acid, and other inorganic acids as well as with succinic acid, tartaric acid, malonic acid, maleic acid, malic acid, benzoic acid, phthalic acid, nicotinic acid, and other organic acids, provided the respective salts are pharmaceutically acceptable and substantially well tolerated in the doses administered.

As mentioned hereinbefore the instant compounds exhibit valuable properties as a result of pharmacological examination using the following methods:

(I) Determination of the medium lethal dose in white mice (NMRI) according to Litchfield, J. F. and Wilcoxon, F., J. Pharmacol, exp. Therap. 96, 99–113 (1949).

(II) Determination of the peripheral spasmolytic effect in isolated guinea pig-Ileum with barium chloride dose ($5\times 10^{-4}$ g./ml.), nicotine dose ($2\times 10^{-6}$ g./ml.), and histamine dose ($2\times 10^{-7}$ g./ml.), according to Magnus, R., Pfluegers Archiv. ges. Physiol. 102, 123 (1904).

(III) Determination of the blood pressure-lowering effect in rats which are under urethan-narcosis.

(IV) Determinationof the anti-inflammatory effect in the rat's foot edema, induced by subplantar injection of carrageenin according to Winter, Ch. A., Risley E. A. and Nuss, G. W., J. Pharmacol. exp. Therap. 141, 360–376 (1963).

The foregoing articles are herein incorporated by reference.

Especially noteworthy for their spasmolytic and other effects are the compounds of the general formula above in which R is methyl, $n$ is 2, $R_1$ hydrogen and $R_2$ is β-phenylethyl, β-phenylethyl substituted by 1 or 2 methoxy groups or compounds in which $R_1$ and $R_2$ together with the N-atom are pyrrolidinyl or morpholino. Their spasmolytic effect is comparable to that of papaverine (See Goodman and Gilman, above, pages 279–280). These compounds are also effective as blood pressure-lowering agents. In comparative tests compounds of the invention showed superior performance than papaverine. Likewise compounds of the invention show anti-inflammatory effects comparable to that of acetylsalicylic acid. The combination of advantageous properties described above, the low toxicity and low side effects make the compounds of the invention especially valuable in the medical sciences.

What is claimed is:

1. An aminobenzylcycloalkylnitrile of the formula

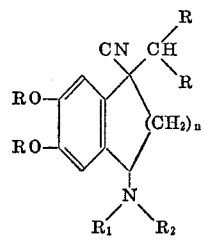

wherein R is lower alkyl; $n$ is 1 or 2; $R_1$ is hydrogen, or lower alkyl, and $R_2$ is straight or branched chain lower alkyl, phenyl-lower alkyl, or halo, lower alkoxy, benzyloxy or trifluoromethyl substituted phenyl-lower alkyl, or taken together with the N atom $R_1$ and $R_2$ are pyrrolidinyl, piperidino, morpholino, piperazino, or N-methyl-piperazino.

2. A compound as defined in claim 1 wherein R is methyl.

3. A compound as defined in claim 2 wherein $R_1$ is hydrogen.

4. A compound as defined in claim 2 wherein $R_1$ is hydrogen and $R_2$ is diloweralkoxyphenyl-lower alkyl.

5. A compound of claim 4 wherein $R_2$ is dimethoxyphenyl lower alkyl.

6. A compound of claim 5 wherein $R_2$ is dimethoxyphenylethyl.

7. A compound of claim 4 wherein $R_2$ is diethoxyphenylethyl.

8. A compound of claim 1 wherein $R_2$ is phenyl lower alkyl.

9. A compound of claim 1 wherein $R_2$ is halophenyl lower alkyl.

10. A compound of claim 9 wherein $R_2$ is chlorophenyl lower alkyl.

11. A compound of claim 1 wherein $R_1$ is methyl and $R_2$ is trifluoromethylphenyl lower alkyl.

12. A compound of claim 1 wherein $R_1$ is hydrogen and $R_2$ is trifluoromethylphenyl lower alkyl.

13. 1-cyano-1-isopropyl-4-[N-methyl-N-β-(3,4-dimethoxyphenyl)-ethyl]-amino-6,7-dimethoxy-tetraline.

14. 1-cyano - 1 - isopropyl-4-(n-hexyl-amino-6,7-dimethoxy-tetraline.

15. 1-cyano-1-isopropyl-3-piperidino - 5,6 - dimethoxyindane.

16. 1-cyano-1-isopropyl-4-[N-methyl-N-β-(3 - trifluoromethylphenyl)-ethyl]-amino-6,7-dimethoxy-tetraline.

17. 1-cyano-1-isopropyl-4-pyrrolidinyl-6,7 - dimethoxytetraline.

References Cited
UNITED STATES PATENTS

| | | | |
|---|---|---|---|
| 2,075,359 | 3/1937 | Salzberg et al. | 424—250 |
| 2,075,359 | 3/1937 | Salzberg et al. | 424—250 |
| 2,352,020 | 6/1944 | Scheuing et al. | 260—294.7 M |

OTHER REFERENCES

Synthetic Organic Chemistry, Wagner et al., John Wiley & Sons, Inc., 1953, pp. 666–670.

HENRY R. JILES, Primary Examiner

S. D. WINTERS, Assistant Examiner

U.S. Cl. X.R.

260—465 E, 326.5 N, 247.7 C, 268.3 C, 465 G, 465 R, 465 R; 424—267, 304, 274, 248, 250